Feb. 5, 1957 F. FINNIGAN 2,780,025
METHOD AND COMPOSITION OF MATTER FOR DESTROYING RODENTS
Filed Aug. 20, 1953
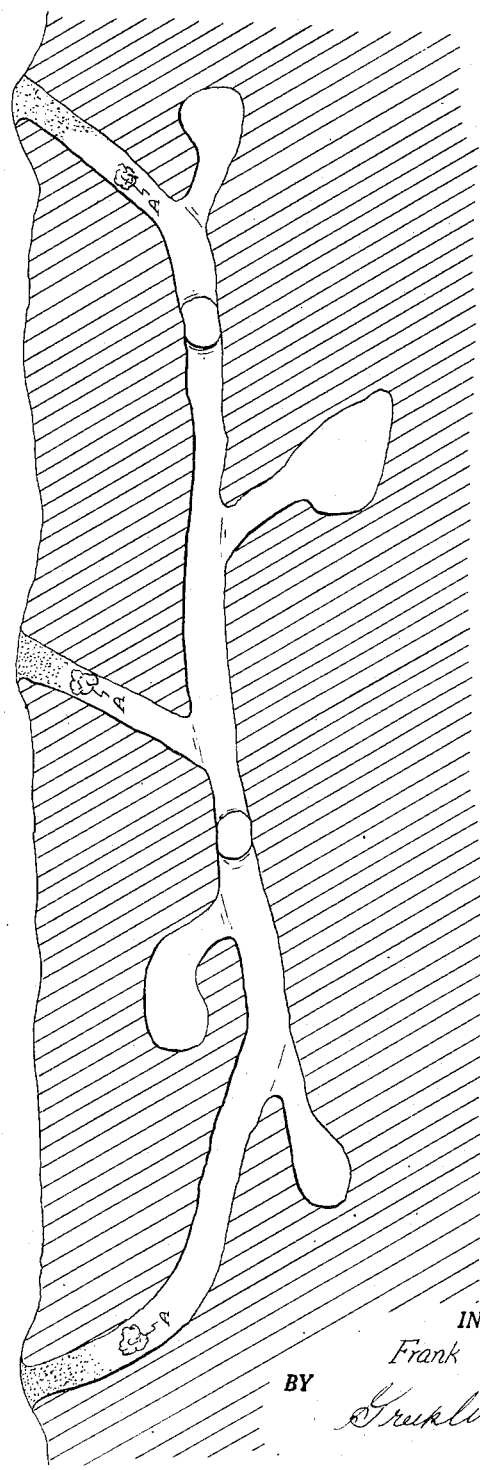
INVENTOR.
Frank Finnigan
BY
Atty.

United States Patent Office 2,780,025
Patented Feb. 5, 1957

2,780,025
METHOD AND COMPOSITION OF MATTER FOR DESTROYING RODENTS

Frank Finnigan, East Wenatchee, Wash.

Application August 20, 1953, Serial No. 375,330

4 Claims. (Cl. 43—124)

My invention relates to the provision of a method and composition of matter for destroying such rodents as pocket gophers and the like in their burrows. It is well known that pocket gophers become quite destructive to plant life and to date, the principal recommended manner of controlling them is by trapping. The destructive characteristics of these rodents are well set forth in Conservation Bulletin 23 of the Fish and Wild Life Services of the U. S. Department of the Interior. This bulletin describes in detail the methods of trapping and poisoning the rodents but in spite of all the known methods set forth in this bulletin, the problem of controlling the pocket gopher continues to be acute. For example, in the May 1952 issue of the Better Fruit magazine, it is stated on page 14 that pocket gophers are serious pests in central Washington and Oregon orchards. This article points out that poisoning in the spring has not been satisfactory and that the use of gases to destroy the rodents is not encouraged.

I have invented a method and composition by which I am able to destroy the pocket gopher and other burrowing rodents in their burrows in an efficient manner. The nature of my invention will appear from the following detailed description thereof and by reference to the accompanying drawing wherein the single figure illustrates diagrammatically the runway system of the pocket gopher and the way in which I destroy the gopher while he is in the runway system. As shown in the drawings, the runway system of a pocket gopher may comprise several surface outlets, all of which are filled with excavated dirt. Below the surface outlets there are open runways and storage chambers in which the rodent stores its food supply. It is well known that when you apply gas to the runway, the gopher will at first warning of the gas, move away from it and fill the runway with a barrier of dirt so as to cut off the inflow of gas to the rest of the runway. Because of this characteristic the various fumigants and gases that have been tried have not been at all effective. The gases tend to rise in loose soil and are soon lost. Furthermore the odor of the gas gives such a warning as to enable the rodent to escape without serious harm.

According to my invention I prepare a composition which produces a substantially odorless gas and one which will penetrate down into the lowermost chambers of the burrows. In preparing the composition I dissolve 8 grains of an 8% concentrate of an oil soluble chlorophyll in an inert oil. The oil soluble chlorophyll I use can be readily purchased on the market. As an example, it is offered for sale by Charles Bourman & Company from their plant at Holland, Michigan. I find that ordinary mineral oil (liquid petrolatum) in the amount of 200 grains will dissolve the 8 grains of the oil soluble chlorophyll concentrate. After the chlorophyll is placed in the oil for a short time I add a small amount of carbon tetrachloride which appears to speed up the dissolving of the chlorophyll. I then add enough carbon tetrachloride to produce a gallon of the composition. The one gallon of liquid composition contains 8 grains of 8% oil soluble chlorophyll and 200 grains of mineral oil. The carbon tetrachloride will vaporize slowly.

In order to kill the gophers, I dip a small piece of adsorbent material shown at A in the drawings, in the solution and insert it in any openings to the gopher runway that I can find. If there are no apparent openings, these can be made in the manner described in the Conservation Bulletin 23 referred to hereinbefore. The carbon tetrachloride will vaporize and because of the presence of the oil soluble chlorophyll, the odor is masked to a substantial degree so that the gopher does not perceive the presence of the gas in time to enable him to wall off the burrow. The heavy carbon tetrachloride gas has the property of carrying with it the dissolved chlorophyll and because the gas is heavy, it fills the bottom chambers of the gopher runway and continues to stay in the runway gradually replacing all of the air. The gopher is asphyxiated.

The method and composition hereinbefore described has several advantages. First it will not injure the trees or plants when used in the quantities necessary to destroy the rodents. Secondly it will settle into the deep holes and not quickly escape to the surface. It is non-inflammable so that there is no fire hazard and it is relatively safe to use. One or two pieces of absorbent paper or cloth to which ½ to 1 ounce of the composition is applied, will be ample to take care of most burrows. If there is an extensive indication on the surface of many burrow openings, then more applications are necessary.

It is believed that the nature and advantages of my invention will be apparent from the foregoing description.

Having thus described my invention, I claim:

1. A method of asphyxiating burrowing rodents, such as pocket gophers, in their burrows, which method comprises introducing into the burrows a carbon tetrachloride vapor and a masking agent for the vapor comprising chlorophyll.

2. A method of asphyxiating burrowing rodents, such as pocket gophers, in their burrows which comprises dissolving oil soluble chlorophyll in mineral oil, dissolving the resultant product in carbon tetrachloride, wetting a body of absorbent material with the solution and placing the body in the burrow.

3. A composition of matter for the purpose described comprising a solution comprising oil soluble chlorophyll and mineral oil in carbon tetrachloride.

4. A composition of matter for the purpose described comprising liquid carbon tetrachloride having in solution 8 grains of 8% oil soluble chlorophyll and 200 grains mineral oil per gallon of carbon tetrachloride.

References Cited in the file of this patent

UNITED STATES PATENTS

| 1,052,376 | Payne | Feb. 4, 1913 |
| 2,337,232 | Daly | Dec. 21, 1943 |
| 2,473,984 | Bickerton | June 21, 1949 |

FOREIGN PATENTS

| 652,458 | Germany | Oct. 30, 1937 |

OTHER REFERENCES

"Manufacturing Chemist," April 1953 issue, pages 152–154. Article by Mitchell.

"Drug and Cosmetic Industry," May 1953, pages 612, 613, and 7–6–13. Article by Bryan.

"Consumer Reports," for October 1952, pages 487–489.

"Oil and Colour Trade Journal," April 14, 1939, pages 1078–1080. Article by McClurkin.

Washington Star, Feb. 27, 1953 issue, editorial page. Article by Thomas R. Henry.